(12) United States Patent
Eiron et al.

(10) Patent No.: US 7,464,076 B2
(45) Date of Patent: Dec. 9, 2008

(54) SYSTEM AND METHOD AND COMPUTER PROGRAM PRODUCT FOR RANKING LOGICAL DIRECTORIES

(75) Inventors: Nadav Eiron, San Jose, CA (US); Kevin Snow McCurley, San Jose, CA (US); John Anthony Tomlin, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 474 days.

(21) Appl. No.: 10/847,143

(22) Filed: May 15, 2004

(65) Prior Publication Data

US 2005/0256887 A1    Nov. 17, 2005

(51) Int. Cl.
  *G06F 17/30* (2006.01)
(52) U.S. Cl. .............................. 707/3; 707/4; 707/100
(58) Field of Classification Search ................ None
  See application file for complete search history.

(56) References Cited

U.S. PATENT DOCUMENTS

| | | | | |
|---|---|---|---|---|
| 5,450,535 | A * | 9/1995 | North .......................... | 345/440 |
| 6,108,698 | A * | 8/2000 | Tenev et al. .................. | 709/220 |
| 6,256,648 | B1 * | 7/2001 | Hill et al. .................... | 715/234 |
| 6,665,837 | B1 * | 12/2003 | Dean et al. ................ | 715/501.1 |
| 7,089,252 | B2 * | 8/2006 | Tomlin et al. ............... | 707/101 |
| 7,216,123 | B2 * | 5/2007 | Kamvar et al. ................ | 707/5 |
| 7,260,583 | B2 * | 8/2007 | Wiener et al. ............... | 707/102 |
| 2004/0193636 | A1 * | 9/2004 | Black et al. .................. | 707/102 |
| 2005/0216533 | A1 * | 9/2005 | Berkhin ...................... | 707/204 |

OTHER PUBLICATIONS

Sepandar D. Kamvar et al. Extrapolation Methods for Accelerating PageRank Computations. ACM May 20-24, 2003.*
Loren Terveen et al. Constructing, organizing, and visualizing collections of topically related web resources. ACM 1999.*
Zheng Chen et al. Building a Web Thesaurus from Web Link Structure. ACM Jul. 28-Aug. 1, 2003.*
Chiasen Chung and Charles L. A. Clarke.Topic-Oriented Collaborative Crawling. Copyright Nov. 4-9, 2002. Pub. in ACM.*

(Continued)

*Primary Examiner*—Neveen Abel-Jalil
(74) *Attorney, Agent, or Firm*—Samuel A. Kassatly; Jon A. Gibbons; Fleit Gibbons Gutman Bongini & Bianco P.L.

(57) ABSTRACT

A logical directory ranking system ranks documents or web pages utilizing logical directories. The present system groups together compound documents as a single information node with one or more leaves, constructing a logical directory graph. URLs can be grouped at a level of granularity below an individual directory. For example, the URLs may be grouped together on the basis of hostname, domain, or any level of the hierarchy of the URLs. Edges in the logical directory graph are formed by links between the logical directories. Edges have weights corresponding to the number of links between logical directories. Nodes have weights corresponding to the number of web pages or leaves represented by a node. A ranking level is determined for each node as a function of the node weight and the edge weight. The ranking level is then applied to each URL that the node represents.

7 Claims, 5 Drawing Sheets

OTHER PUBLICATIONS

Krishna Kummamuru et al. A Hierarchical Monothetic Documnet Clustering Algorithem for Summarization and Browsing Search Results. Org. Proceedings. Pub. 2004.*

Sacha Berger. Evolving Association Index. White Paper. Dec. 14, 2001.*

Ulfar Erlingsson et al. Interactive Graph Drawing on the World Wide Web. IGDraw. Pub. 1998.*

Filippo Ricca and Paolo Tonella. Building a Tool for the Analysis and Testing of Web Applications: Problems and Solutions. Year of Pub. 2001.*

Mathew Richardson and Pedro Domingos. The Intelligent Surfer: Probabilistic Combination of Link and Content Information in PageRank. Pub. 2001.*

Current Applicant's own pub. WWW2004 May 17-22, 2004. Ranking the Web Frontier. Nadav Eiron, Kevin S. McCurley, John A. Tomlin. IBM Almaden Research Center.*

Zhuo-Ming Xu et al. Site-Granularity Topic Distillation on the Web by Combining Content and Hyperlink Analysis. IEEE 2003.*

Ian Rogers, "The Google Pagerank Algorithm and How It Works," available at: http://WWW.iprcom.com/papers/pagerank/, on Jan. 27, 2004.

"Holy smokes Batman, that is a Huge # of links," Apr. 4, 2003, available at: http://WWW.webmasterworld.com/forum12/748-2-15.htm, on Mar. 22, 2004.

"Edutech LMS Evaluation: Report," available at: http://WWW.edutech.ch/edutech/tools/ev2showreport.php?details=1 &critdescr=1&compi d0 . . . , on Mar. 22, 2004.

Gisli Hjaltason et al., "Using Spatial Sorting and Ranking in Model-Based Object Recognition," 1998.

"Depth vs. Breadth," available at: http://WWW.webmasterworld.com/forum10003/2924.htm, on Mar. 22, 2004.

Rethinking Drupal's meta tags beyond version 3, available at: http://www.drupal.org/node/view/55, on Mar. 22, 2004.

J. Scott Olsson, "Categorization for Malach AMSC 663, Semester Progress Report," olsson@math.umd.edu, available at: http://www.math.umd.edu/~olsson/amsc663/docs/prop-talk.pdf, on May 15, 2004.

* cited by examiner

SYSTEM AND METHOD AND COMPUTER PROGRAM PRODUCT FOR RANKING LOGICAL DIRECTORIES

CROSS-REFERENCE TO RELATED APPLICATION

The present application is related to co-pending application, title "System and Method for Ranking Nodes in a Network," Ser. No. 10/847,164, which is filed on the same date as the present application, and which is incorporated herein by reference in its entirety.

FIELD OF THE INVENTION

The present invention generally relates to ranking directories, subdirectories, and files in a logical directory. In particular, the present system relates to a method of exploiting the structure of a uniform resource locator of web pages in the WWW to identify nodes in a logical directory and provide a more efficient, more accurate, and less costly approach to ranking web pages on the WWW.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. Due to the vast number of WWW sites, and the ease with which material may be published on the WWW, the quality and relevance of web pages varies greatly. These features of the WWW make ranking of web pages by their authoritativeness or relevance an important task. Ranking is often integrated with WWW search engines. These search engines use various means to determine the relevance of web pages, including their ranks, to a user-defined search.

The authors of web pages provide information known as metadata within the body of the document that defines the web pages. This document is typically written in, for example, hypertext markup language (HTML). A computer software product known as a web crawler systematically accesses web pages by sequentially following hypertext links (hyperlinks) from page to page.

The crawler indexes the pages for use by the search engines using information about a web page as provided by its address or Uniform Resource Locator (URL), metadata, and other criteria found within the page. The crawler is run periodically to update previously stored data and to append information about newly created web pages. The information compiled by the crawler is stored in a metadata repository or database. The search engines search this repository to identify matches for the user-defined search rather than attempt to find matches in real time.

Internet search engines provide a primary interface between an Internet user and the web pages or web sites accessible through the Internet. Consequently, Internet companies are expending resources to further improve searching results in both accuracy and response time to attract more Internet users to the web sites of the Internet companies. Higher Internet traffic on the web site of an Internet company typically increases revenue for the Internet company through, for example, increased sales at that web site or greater exposure of the Internet user to advertisements on the web site of the Internet company.

An exemplary search engine is the Google® search engine. An important aspect of the Google® search engine is the ability to rank web pages according to the authority of the web pages with respect to a search. One of the ranking techniques used by the Google® search engine is the PageRank algorithm. Reference is made to Lawrence Page, Sergey Brin, Rajeev Motwani, and Terry Winograd, "The PageRank citation ranking: Bringing order to the web," Technical report, Stanford Digital Library Technologies Project, 1998. Paper SIDL-WP-1999-0120 (version of Nov. 11, 1999). The PageRank Algorithm calculates a stationary distribution of a Markov chain induced by hyperlink connectivity on the WWW and uses that distribution to rank all web pages. This same technique used by the PageRank algorithm applies to intranets or subsets of the WWW.

Although the PageRank algorithm has proven to be useful, it would be desirable to present additional improvements. The calculations performed by the PageRank algorithm require large amounts of data and large amounts of processing time. The WWW is growing rapidly; consequently, the computations performed by the PageRank algorithm are becoming increasingly difficult. In addition, web sites are increasingly using a variety of techniques to manipulate their ranking in order to generate user traffic on the web site, increase sales through commercial web sites, and increase advertising revenue.

Further, the use of templatized hyperlinks on web sites is increasing rapidly. Templatized web pages share a common administrative authority, a common look, and a common feel. For a user, the common look and feel is valuable because it provides context for browsing. However, templatized pages skew ranking. Since all pages that conform to a common template share many links, it is clear that these links cannot be relevant to the specific content on these pages.

Currently, the Google® search engine indexes about 3.3 billion web pages with nearly 90 billion hyperlinks. Representing these hyperlinks as source and destination URLs amounts to approximately ten terabytes of data. The hyperlinks are viewed as a link graph by the PageRank algorithm. In most implementations of search engines, a typical hyperlink is represented by a four-byte ID. Use of the four-byte ID reduces the amount of data required to represent the link graph to 360 gigabytes at the cost of considerable processing time in replacing the URL with the corresponding four-byte ID. Once the four-byte ID has been determined for the URL, the PageRank algorithm calculates a stationary distribution of a Markov chain, requiring approximately 30 to 50 cycles through the data set of the link graph to achieve a reasonable level of convergence.

Furthermore, the analysis by the PageRank algorithm of each individual URL makes the PageRank algorithm susceptible to deliberate ranking manipulation of web pages. One example of ranking manipulation is link spamming. One method of link spamming involves posting messages on message boards, guest books, etc., with links to a web site. These increased links increase the ranking of the website. Another method of link spamming involves forming or joining a "link farm". A link farm is a network of web pages or web sites that are heavily cross-linked. When joining a link farm, a web site receives a link from all the other web sites in the link farm and, in return, places links to all the other web sites in the link farm. However, the reputation and popularity of search engines such as the Google® search engine relies on an accurate ranking of the web sites in response to a search.

One technique proposed for improving the ranking of web pages involves the use of a host rank that groups web pages based on the host of the web page. Although the host rank technique has proven to be useful, it would be desirable to present additional improvements. Many hosts comprise web pages that are fairly uniform in content and in quality. However, a host such as www.geocities.com that provides free web space to users comprises widely varying content both in topic and quality. Some of the subsites on www.geocities.com comprise, for example, very high quality open source software projects. These highly respected subsites have many links into them. Other subsites on www.geocities.com comprise personal information about users, their hobbies, etc. The range of topic and quality of subsite in www.geocities.com requires a finer granularity than the host rank for analysis and grouping. Reference is made to "Ranking the Web Frontier and Arvind Arasu, Jasmine Novak, Andrew Tomkins & John Tomlin, "PageRank Computation and the Structure of the Web: Experiments and Algorithms," Proceedings of WWW2002, May 2002; and co-pending U.S. patent application titled "System and Method for Rapid Computation of PageRank", Ser. No. 10/132,047, by A. Arasu, Andrew Tomkins and John Tomlin, which was filed on Apr. 25, 2002.

What is therefore needed is a system, a computer program product, and an associated method for improving the efficiency of ranking web pages while minimizing manipulation of the ranking process by web sites and Internet companies. The need for such a solution has heretofore remained unsatisfied.

SUMMARY OF THE INVENTION

The present invention satisfies this need, and presents a system, a computer program product, and an associated method (collectively referred to herein as "the system" or "the present system") for ranking documents or web pages utilizing logical directories. The present system dramatically reduces the amount of data and computation required for ranking documents and web pages by a search engine while preserving the essential value of ranking algorithms such as PageRank.

Web information tends to have a hierarchical structure reflected in URLs. Reference is made to Nadav Eiron and Kevin S. McCurley, "Locality, hierarchy, and bidirectionality in the web," In *Workshop on Algorithms and Models for the Web Graph*, Budapest, May 2003; and Nadav Eiron and Kevin S. McCurley, "Untangling compound documents on the web," In *Proc. 14th ACM Conf on Hypertext*, pages 85-94, 2003. Many web servers simply export a file system in a hierarchical structure. Consequently, it has become a common practice for humans to group related files together in a single directory, and for administrative delegation of authorship to be performed at the directory level. This hierarchical structure is even present on servers whose content is not stored in a hierarchical file system. The content may be stored in a data repository such as, for example, a database. However, as the URL standard was originally designed to incorporate hierarchical structure, the contents of the data repository are presented as a hierarchical structure by the delimiters in a URL representing the data.

Furthermore, URLs can often be grouped into "compound documents" that represent a single unit of information. Such compound documents tend to comprise URLs that agree up to a last delimiter such as a forward slash (/). Consequently, the present system groups together URLs that agree up to the last delimiter as a single information node, constructing a logical directory graph. The nodes in the logical directory graph correspond to URL prefixes up to the last delimiter. The present system denotes information after the last delimiter in the URL string as leaves in the logical directory graph.

The web pages and documents that are leaves in the logical directory graph typically comprise similar information with the same authority or rank. Consequently, the present system groups these leaves together as a unit with respect to the ranking process. Further, there is an edge from one node to another if there is a link from a URL in the one logical directory to a URL in another logical directory. The present system groups URLs at a finer level of granularity than entire host names, but still conforms to a human-designed hierarchical organization of information.

"Dynamic" URLs containing a dynamic character such as a question mark (?) tend not to follow a hierarchical organization of information. However, such URLs are often an indicator for the existence of an underlying database capable of serving an enormous number of URLs. These URLs are often still closely related to each other and can be grouped together by the present system.

The entity in the URL string preceding the last delimiter is a directory. The present system groups URLs that are in the same directory on a server as a single node on a graph, accumulating all of the hyperlinks related to those URLs into the single node. All URLs that match up to the last delimiter in the URL string are considered a single node and assigned a rank, the directory rank. For example, the following two exemplary non-functional URLs are treated as a single node: where "http://www.directory" is the directory. All inlinks (links into the web pages) and outlinks (links out of the web pages) from the web pages associated with these URLs are assigned to the node.

The present system assigns a node weight to each node corresponding to the number of leaves associated with that node. In addition, the present system assigns an edge weight to each edge between nodes representing the number of links between the nodes. In one embodiment, the present system assigns a node weight of one to each node and an edge weight of one to each edge to reduce processing time and data storage requirements.

The present system assigns a ranking level to each node determined from the node weight and the edge weight. System 10 then applies the ranking level to each leaf or URL that the node represents.

A logical directory graph is formed of the nodes with hyperlinks between the nodes forming edges in the graph. Any variation of ranking algorithms such as PageRank can be performed on the logical directory graph. Furthermore, any other form of ranking of pages may use the present system to calculate an aggregate rank for a group and assign the aggregate rank to individual web pages, files, or documents within the group.

In addition to grouping web pages using a hierarchical structure of URLs, the present system can select groups of web pages based on the perceived homogeneity of value to a user. Moreover, URLs may be grouped at a level of granularity below an individual directory. For example, the URLs may be grouped together on the basis of hostname, domain, or any level of the hierarchy of the URLs. The web pages, files, or documents within a single grouping are considered roughly equivalent in their ranking.

The present system may be embodied in a utility program such as a logical directory ranking utility program. The present system provides means for the user to identify a directory or an index for which the present system performs logical directory ranking. The present system further provides means for the user to specify whether the logical directory ranking utility program determines weights for nodes and for edges generated by the logical ranking program for a logical directory graph. Alternatively, the user may specify that weights not be determined for the nodes and edges in the logical directory graph, using a weight of one for each node and each edge. The user selects the input data, specifies whether weights are determined for the nodes and edges, and then invokes the logical directory ranking utility program to rank the directory or the index.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Internet: A collection of interconnected public and private computer networks that are linked together with routers by a set of standards protocols to form a global, distributed network.

Leaf: Terminal node of a tree, a node with no child/daughter.

Logical Directory: a directory derived from a logical representation of an index or other hierarchical structure such as a URL.

Node: A point or vertex representing a logical directory in a logical directory graph.

Tree: A hierarchical structure that is made up by nodes. Nodes are connected by edges from one node to another. A single node at apex of the tree is known as the root node, while the terminus of a path in the opposite direction is a leaf.

URL (Uniform Resource Locator): A unique address that fully specifies the location of a content object on the Internet. The general format of a URL is protocol://server-address/path/filename, where the server-address is referenced as the host rank.

World Wide Web (WWW, also Web): An Internet client-server hypertext distributed information retrieval system.

Figure 1:
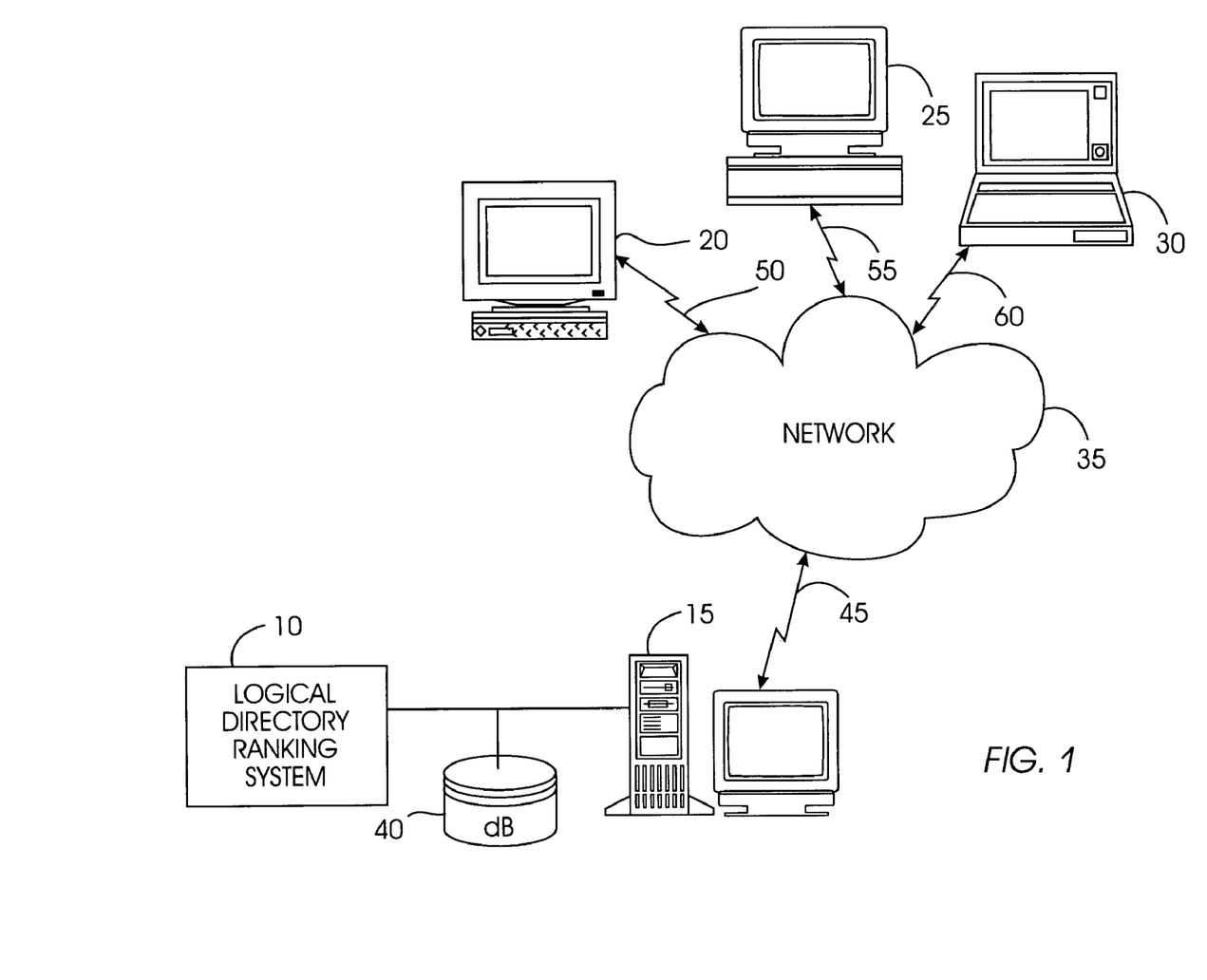
FIG. 1 is a schematic illustration of an exemplary operating environment in which a logical directory ranking system of the present invention can be used.

FIG. 1 portrays an exemplary overall environment in which a system and associated method (the "system 10") for ranking logical directories according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

Users, such as remote Internet users, are represented by a variety of computers such as computers 20, 25, 30, and can access the host server 15 through a network 35. In one embodiment, system 10 ranks results obtained by a search engine operated on host server 15. The results are accessed by system 10 from database (dB) 40. Users access the results of the ranking when performing key word searches on the Internet. In another embodiment, users provide an index or other hierarchical structure to system 10; system 10 then ranks the index or other hierarchical structure for the user. Output from system 10 is stored on dB 40 or on a storage repository of the user.

Computers 20, 25, 30 each comprise software that allows the user to interface securely with the host server 15. The host server 15 is connected to network 35 via a communications link 45 such as a telephone, cable, or satellite link. Computers 20, 25, 30, can be connected to network 35 via communications links 50, 55, 60, respectively. While system 10 is described in terms of network 35, computers 20, 25, 30 may also access system 10 locally rather than remotely. Computers 20, 25, 30 may access system 10 either manually, or automatically through the use of an application.

Figure 2:
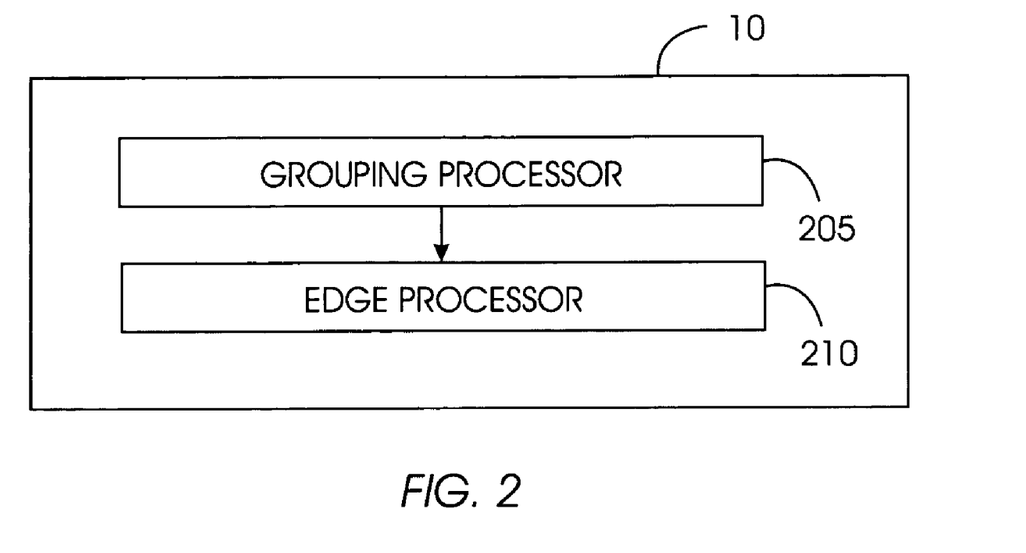
FIG. 2 is a block diagram of the high-level architecture of the logical directory ranking system of FIG. 1.

FIG. 2 illustrates a high level hierarchy of system 10. System 10 comprises a grouping processor 205 and an edge processor 210. The grouping processor 205 forms a logical directory graph of a URL or other hierarchical data. A group node is formed from the logical directory graph that collects subgraphs of similar ranking and quality. Each of the subgraphs corresponds to a leaf on the logical directory graph. The grouping processor 205 assigns a weight to each node that corresponds to the number of subgraphs or leaves accumulated at that group node. The edge processor 210 analyzes links or edges into and out of the group node and assigns an edge weight between linked group nodes based on the number of links between the group nodes. The edge weight on the nodes and the edges can be used to rank the nodes.

In one embodiment, system 10 acknowledges the presence of subgraphs at a group node and edges between group nodes by assigning a weight of one to the group node and to the links between the group nodes. Consequently, system 10 reduces processing time and data storage space to track weights for each node or edge at the expense of ranking accuracy.

A typical URL is structured as a host name followed by one or more directories or subdirectories separated by a delimiter such as a forward slash (/). For example, a company named "ABC" is located in Timbuktu with a computer science department employee named John Doe has the following exemplary non-functional URL associated with a webpage:

http://www.timbuktu.abc.com/cs/people/johndoe/pdfs/papertitle. (1)

John Doe has a personal subsite on the company website on which he posts pdf versions of articles and papers he has written, one of which is listed as "papertitle".

Figure 3:
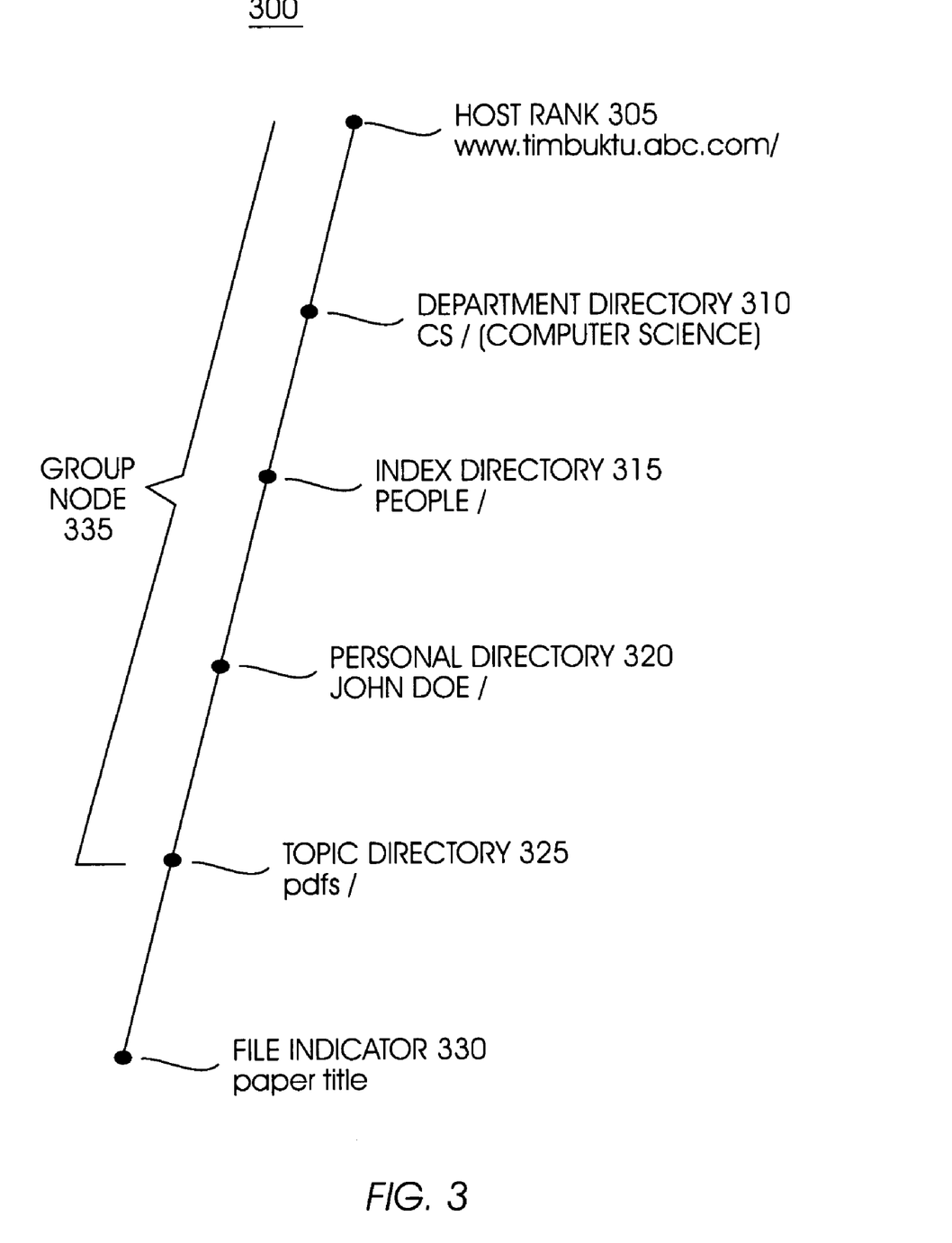
FIG. 3 is schematic illustration of an exemplary logical directory that may be ranked by the logical directory ranking system of FIGS. 1 and 2.

System 10 recognizes that all the articles and papers written by John Doe and attached under "pdfs" most likely comprise information of equal quality and rank. FIG. 3 illustrates a subgraph 300 of URL (1) showing URL (1) decomposed into a host rank 305 comprising "www.timbuktu.abc.com/", a department directory 310 comprising cs/", an index directory 315 comprising "people/", and a personal directory 320 comprising "johndoe/", and a topic directory 325 comprising "pdfs/". A file indicator 330 comprising "papertitle" represents a leaf on subgraph 300. A group node 335 represents a logical directory formed by topic directory 325; the logical directory represents all the articles and papers listed under "pdfs/".

The website for company ABC at Timbuktu may be large, with numerous logical directories at each logical directory level such as department directory 310, index directory 315, personal directory 320, and topic directory 325. A logical directory for the website for company ABC at Timbuktu then comprises many subgraphs such as subgraph 300.

System 10 forms the group node 335 by locating the last delimiter in the URL and grouping the URLs that agree up to the last delimiter as a single node. For example, system 10 considers the following exemplary non-functional URL segment, "http://www.timbuktu.abc.com/cs/people/johndoe/pdfs/", as a single group node, the group node 350, in subgraph 300. All calculations that performed on subgraph 300 can be performed on the reduced size logical directory graph comprising group nodes such as the group node 350. URLs that agree up to the last delimiter (i.e., the group node 350) tend to be on the same subject, and often have the same author or are part of a compound document. Consequently, a ranking algorithm can assign the same rank to each of the group nodes such as the group node 350 in subgraph 300.

Less typical URLs follow different formats in structure. For example, URLs reduced to a group node such as the group node 350 and the hyperlinks that link to the group node may not form a connected component. In one embodiment, system 10 forms a connected group node by grouping these URLs into their connected components rather than grouping them into a group node. In forming connected components, system 10 considers strongly connected components where the connectivity is over intra-directory links, weakly connected components, and components that are strongly connected when links to the immediate parent directory are also considered.

In another embodiment, system 10 forms two or more group nodes such as node 350 from a directory. Breaking a directory into two or more group nodes is beneficial when a logical directory graph such as subgraph 300 formed from the URLs in a directory has an extremely large diameter. Furthermore, the links from outside the directory into one of the URLs in the directory may be concentrated on a small number of URLs in the directory. System 10 forms two or more group nodes in this case to achieve more accurate ranking characteristics for those group nodes with the highest percentage of links.

In similar fashion, system 10 forms group nodes based on the relevancy and value of a web page. For example, system 10 may group together pages within a directory that are tightly linked. Conversely, system 10 may consider individually pages in a directory that are not well connected. System 10 may further consider pages in a directory that are not well connected as strongly connected components for the process of ranking.

Some URLs comprise a structure that is not hierarchical, such as the following exemplary non-functional URL:

http://www.abc.com/
products.cgi?v1=val1&v2=val2&v3=val3 (2)

URL (2) comprises a dynamic delimiter such as a question mark (?) followed by a specification comprising variable names with associated values (a variable name/value pair) separated by a variable delimiter such as an ampersand (&). URLs such as URL (2) are generated by a website as a response to a query or to data input to an HTML form. A URL of this form may further be used to show a cell from an underlying relational table.

In one embodiment, system 10 forms a truncated group node by truncating URL (2) following the dynamic delimiter. This approach is particularly applicable when the number of known URLs that match the truncated group node remain below a predetermined threshold or when the web pages represented by the truncated group node have a great deal of similarity in content.

In another embodiment, system 10 selects a single variable name in the portion of the URL following the dynamic delimiter and groups all of the URLs that comprise the same value for this variable into a dynamic group node. This approach forms a number of dynamic groups equal to the number of possible values for the selected variable.

In a further embodiment, system 10 converts the dynamic delimiter and the variable delimiter into a standard delimiter such as the forward slash (/) and processes a URL such as URL (2) as a logical directory graph such as subgraph 300.

In yet another embodiment, system 10 recognizes that "k" possible variables that may be formed by the variable name/value pairs following the dynamic delimiter in the URL. Consequently, the URLs can represent elements in a k-dimensional space. The k-dimensional space can be partitioned in a variety of ways using any number of existing clustering techniques. Partitioning the k-dimensional space results in a smaller number of sets of URLs. Each set of URLs can be formed into a clustered group node similar to the group node of FIG. 3.

The logical directory graph comprises any number of the types of nodes presented: the group node, the connected group node, the truncated group node, the dynamic group node, and the clustered group node. In addition, other types of nodes may be formed by system 10 to group a set of URLs based on similar rank and quality. The more general term, group node, may reference any of the types of nodes that system 10 forms such as, for example, the connected group node, the truncated group node, the dynamic group node, and the clustered group node.

Grouping URLs into sets that form group nodes in a smaller logical directory graph simplifies calculations performed on the URLs by reducing the amount of required data. In yet another embodiment, system 10 groups URLs by their hostname similar in a method similar to hostrank that is known in the field. In another embodiment, system 10 groups URLs using the domain name system hierarchy on hostnames. This approach is particularly useful for hosts with a very small number of URLs.

Figure 4:
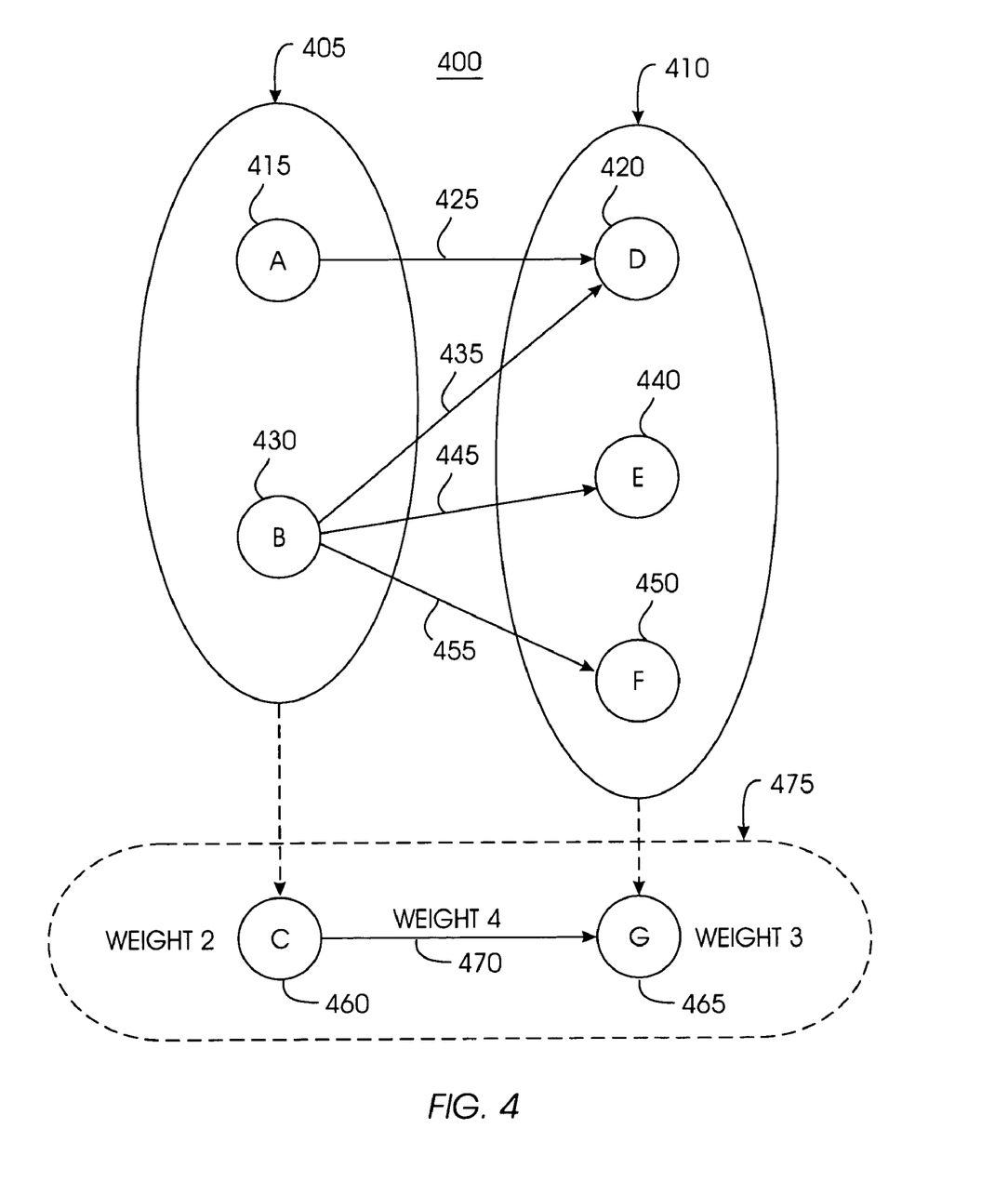
FIG. 4 is a schematic illustration of two exemplary logical directories illustrating the determination of a set of weights for a set of nodes and an edge in a logical directory graph generated by the logical directory ranking system of FIGS. 1 and 2.

When nodes and edges in the logical directory graph are aggregated together, edges collapse down onto a single edge, allowing system 10 to produce an edge-weighted logical directory graph. The weight of an edge in the edge-weighted logical directory graph corresponds to the number of edges or links between group nodes. FIG. 4 illustrates an exemplary logical directory graph 400 comprising, for example, a logical directory graph 405 representing a first set of URLs, a logical directory graph 410 representing a second set of URLs, and links between the URLs in logical directory graph 405 and the URLS in logical directory graph 410.

URL A, 415, is linked to URL D, 420, by link 425. URL B, 430, is linked to URL D, 420, by link 435. URL B, 430, is linked to URL E, 440, by link 445. URL B, 430, is further linked to URL F, 450 by link 455. The grouping processor 205 collapses logical directory graph 405 to node C, 460, and assigns a weight of 2 to node C, 460, corresponding the number of URLs in logical directory graph 405. The trouping processor 205 collapses logical directory graph 410 to node G, 465, and assigns a weight of 3 to node G, 465, corresponding the number of URLs in logical directory graph 410.

The edge processor 210 counts the links between URL A, 415, and URL B, 430, in logical directory graph 405 and URL D, 420, URL E, 440, and URL E, 450, in logical directory graph 410, finding four links (link 425, link 435, link 445, and link 455). Consequently, the edge processor 210 assigns a weight of four to a weighted edge 470 between node C, 460, and node G, 465. A weighted-edge logical directory 475 comprises node C, 460, the weighted edge 470, and node G, 465.

In one embodiment, the edge processor 210 does not count the number of links between logical directory graphs, but simply notes when a link between two logical directory graphs exists. Consequently each node and each edge comprise a weight of one. This approach reduces processing and storage requirements for system 10.

There are numerous methods for using the weights in an edge weighted logical directory graph to improve the ranking of the group nodes. In one embodiment, system 10 propagates the rank along an edge in proportion to the weight on the edge, rather than equally among all the edges emanating from a group node. In another embodiment, system 10 uses the weight of one or more group nodes to calculate the distribution of weight from a group node to all of its neighbors, propagating the weight in proportion to the weight of one or more group nodes as a fraction of the total weight of all group nodes for edges emanating from a group node. The edge weights can thus be used to represent the "strength" of a connection between two sets of web pages.

Figure 5:
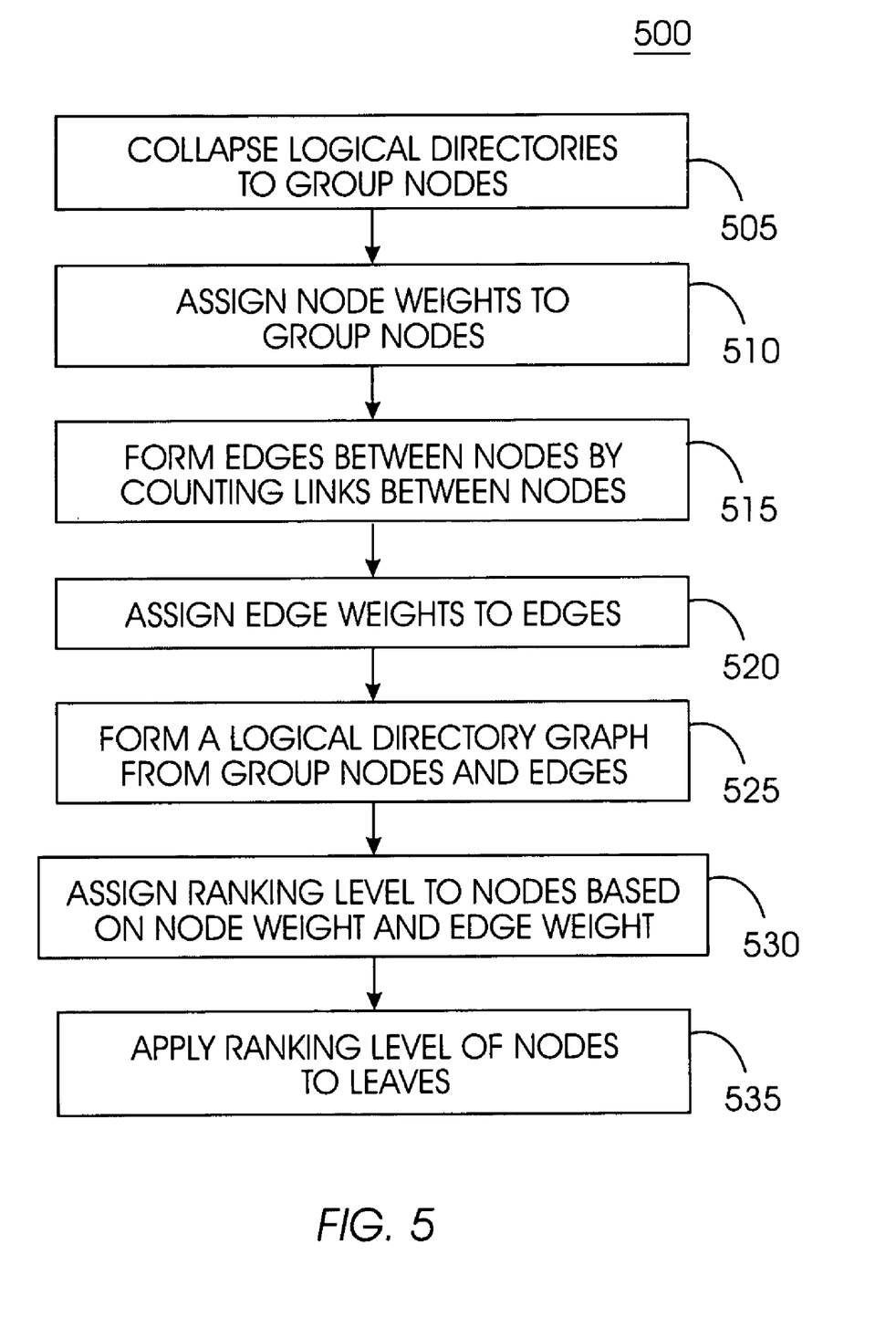
FIG. 5 is a process flow chart illustrating a method of operation of the logical directory ranking system of FIGS. 1 and 2.

FIG. 5 illustrates a method 500 of an operation of system 10. The grouping processor 205 collapses one or more logical directories to one or more group nodes in logical directory graph (step 505). The grouping processor 205 assigns weights to the group nodes based on the number of web pages or leaves in the logical directory graph that the group node represents (step 510). In one embodiment, the grouping processor 205 does not assign weights to the group nodes; each group node receives a weight of one. The group nodes further comprise connected group nodes, truncated group nodes, dynamic group nodes, clustered group nodes, etc. Step 505 can be performed by system 10, for example, while a web browser is creating an index of web pages browsed.

The edge processor 210 forms edges in the logical directory graph by counting a number of links from a first logical directory to a second logical directory for every logical directory in the logical directory graph (step 515). The edge processor 210 assigns edge weights to each of the edges corresponding to the number of links each of the edges represents (step 520). In one embodiment, the edge processor forms an edge for one or more links between logical directories without counting the links such that each of the edges has a weight of one.

System 10 forms a logical directory graph from the nodes formed in step 505 and the edges formed in step 515 (step 525). The logical directory graph can be represented by a matrix also known as an incidence matrix. The incidence matrix comprises the node weights for the nodes and the edge weights for the edges. In one embodiment, each group node and each edge have a weight of one such that the incidence logical directory graph comprises ones and zeros.

System 10 assigns a ranking level to the group nodes based on the node weights and edge weights associated with the nodes (step 530). System 10 then applies the ranking level of the group nodes to the leaves in the logical directory to which the group nodes correspond (step 535)

Any ranking processor may use the output of system 10. For example, applying the PageRank ranking processor used by Google® calculates the stationary distribution of the random walk represented by the incidence matrix. When operating as a logical directory ranking utility, the output of system 10 may be either the incidence matrix or the ranked nodes.

It is to be understood that the specific embodiments of the invention that have been described are merely illustrative of certain applications of the principle of the present invention. Numerous modifications may be made to a system and method for ranking logical directories described herein without departing from the spirit and scope of the present invention. Moreover, while the present invention is described for illustration purpose only in relation to the WWW, it should be clear that the invention is applicable as well to, for example, data derived from any source stored in any format that is accessible by the present invention through a hierarchical representation. Furthermore, although the present invention is described in terms of the PageRank algorithm, it should be clear that the present invention is applicable as well to, for example, other search applications and ranking techniques without departing from the scope of the present invention.

What is claimed is:

What is claimed is:

1. A processor-implemented method for ranking a plurality of nodes in a ranked logical directory graph with a superimposed hierarchy of logical directories, the method comprising:

accessing a plurality of uniform resource locators;

forming a logical directory graph from said plurality of uniform resource locators which have been accessed, wherein each of said uniform resource locators comprises a plurality of elements with at least one argument specification to a dynamic uniform resource locator separated by a delimiter, and represents one of: i) a link to a logical directory in said hierarchy of logical directories, or ii) a link to a web page, file, or iii) document contained in said logical directory comprising:

identifying each node in each of said uniform resource locators corresponding to said logical directory at each logical directory level in said logical directory graph, wherein each said logical directory is represented by information found in said logical directory's uniform resource locator up to a last standard delimiter in said uniform resource locator, forming said logical directory graph comprising at least two nodes thereby providing a greater level of granularity than just a root node;

identifying all leaves by uniform resource locators which match said node's uniform resource locator up to said last standard delimiter, wherein each leaf comprises information found after said last standard delimiter of said leaf's matching uniform resource locator;

forming a single group node in said logical directory graph by: i) grouping together said uniform resource locators for all nodes that match up to said last standard delimiter ii) removing at least one of the plurality of elements from the dynamic uniform resource locator, and iii) grouping a plurality of uniform resource locators with respect to at least one of a plurality of variable names;

forming edges between nodes in said logical directory graph having a link between said each other; and aggregating together into a single edge, all multiple edges found to exist between any two nodes in said logical directory graph;

assigning an edge weight to each of said single edges in said logical directory graph, said edge weight corresponding to a number of links found to exist between said any two nodes;

assigning a node weight to each of said nodes in said logical directory graph, said node weight corresponding to a number of leaves associated with that node;

assigning a ranking level to at least some nodes in said logical directory graph, said ranking level based on said node weight and said edge weight;

applying said ranking level to at least some leaves associated with at least some of said nodes which have been assigned a ranking level; and generating a ranked logical directory graph based upon said ranking level which have been applied to said leaves.

2. The method of claim 1, wherein the logical directory is identified using a structure of a uniform resource locator for a page on the world wide web.

3. The method of claim 1, wherein the plurality of elements comprise a host name and a file path specification.

4. The method of claim 1, wherein the plurality of elements comprise at least one directory.

5. The method of claim 1, wherein the node weight is assigned a predetermined value of one, reducing a processing time of the logical directories.

6. The method of claim 1, wherein the edge weight is assigned a predetermined value of one, reducing processing time of the logical directories.

7. The method of claim 1, wherein the ranked logical directory graph is sent to PageRank processor.

* * * * *